US012762791B2

(12) United States Patent
Ramamohan et al.

(10) Patent No.: US 12,762,791 B2
(45) Date of Patent: Oct. 13, 2026

(54) GENERATING SHADOWS FROM A SEGMENTATION MASK

(71) Applicant: Capital One Services, LLC, McLean, VA (US)

(72) Inventors: Deepak Ramamohan, Mysuru (IN); Rama Teja Gampa, Bangalore (IN)

(73) Assignee: Capital One Services, LLC, McLean, VA (US)

( * ) Notice: Subject to any disclaimer, the term of this patent is extended or adjusted under 35 U.S.C. 154(b) by 82 days.

(21) Appl. No.: 18/906,416

(22) Filed: Oct. 4, 2024

(65) Prior Publication Data

US 2026/0099993 A1 Apr. 9, 2026

(51) Int. Cl.

| | |
|---|---|
| ***G06T 15/60*** | (2006.01) |
| ***G06T 7/11*** | (2017.01) |
| ***G06T 7/12*** | (2017.01) |
| ***G06T 7/194*** | (2017.01) |

(52) U.S. Cl.

CPC ................ *G06T 15/60* (2013.01); *G06T 7/11* (2017.01); *G06T 7/12* (2017.01); *G06T 7/194* (2017.01); *G06T 2207/20021* (2013.01)

(58) Field of Classification Search

None

See application file for complete search history.

(56) References Cited

U.S. PATENT DOCUMENTS

2008/0307341 A1* 12/2008 Ferry .................. G06F 3/04817 715/764
2015/0109299 A1* 4/2015 Thimbleby ............. G06T 15/60 345/426

(Continued)

FOREIGN PATENT DOCUMENTS

CN 115937397 A 4/2023
CN 114626468 B 2/2024

OTHER PUBLICATIONS

Mrinalkanti. "Car Shadow Creation Services: Enhance Your Vehicle Images for a Professional Look". Available from the Internet at https://medium.com/@mrinalkanti9646/car-shadow-creation-services-enhance-your-vehicle-images-for-a-professional-look-6e2546d1b9c4. Jun. 5, 2023. pp. 1-5.

(Continued)

*Primary Examiner* — Jason A Pringle-Parker

(74) *Attorney, Agent, or Firm* — Sterne, Kessler, Goldstein & Fox P.L.L.C.

(57) ABSTRACT

Disclosed herein are system, method, and computer program product embodiments for generating realistic shadows for an image object, such as a vehicle, for computer browsing. The method includes generating a segmentation of an image object; generating a contour from the segmentation mask, wherein the contour comprises an array of the pixels along a boundary of the segmentation mask; calculating a plurality of regions of the contour, wherein each of the plurality of regions comprise a set of continuous points; identifying within the plurality of the regions of the contour, a plurality of key points that correspond to ground contact points of the image object; applying, based on the plurality of key points, a perspective warping to a first shadow template to generate the shadow for the image object, and rendering, on a selected background, the image segmentation as an overlay on the shadow.

20 Claims, 9 Drawing Sheets

Key points identified or estimated in the image
202

Key points pre-defined for the template
204

Warping the key points and composing the image
206

(56) References Cited

U.S. PATENT DOCUMENTS

| | | | | |
|---|---|---|---|---|
| 2015/0113396 | A1* | 4/2015 | Thimbleby | G06T 11/10 715/275 |
| 2019/0147600 | A1* | 5/2019 | Karasev | G06V 10/764 382/107 |
| 2020/0167996 | A1* | 5/2020 | Watanabe | B60R 1/28 |
| 2021/0398318 | A1* | 12/2021 | Deng | G06T 7/11 |
| 2022/0262052 | A1* | 8/2022 | Baidya | G06T 11/23 |
| 2024/0144586 | A1 | 5/2024 | Hold-Geoffroy et al. | |

OTHER PUBLICATIONS bestphotoediting.com. "Car Photo Editing| Car Background replacement| Car Photo Editor". Available from the Internet at https://bestphotoediting.com/car-photo-editing/. Retrieved from the Internet on Jun. 24, 2024. pp. 1-5.

* cited by examiner

GENERATING SHADOWS FROM A SEGMENTATION MASK

BACKGROUND

A number of techniques currently exist to enable adding shadows to imagery. However, lagging behind are improvements to systems where, during an online shopping experience, a user can view shadows that appear realistic.

BRIEF DESCRIPTION OF THE DRAWINGS/FIGURES

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for generating realistic-looking shadows for an image object, such as a vehicle, from a segmentation mask after the object's background has been removed from an image of the object. For example, imagery of a variety of vehicles may be captured at the same or different locations, angles, lighting, resolutions, etc. A segmentation mask includes the contiguous pixels of the image object.

Many car buyers will shop for vehicles online in order to browse the cars without traveling to a location of the vehicle. Consistent imagery with realistic shadowing may enhance or improve the browsing experience. The proposed algorithm generates a segmentation mask of a vehicle image (e.g., one obtained after passing an image through a segmentation algorithm) and automatically generates a shadow for the vehicle displayed in a front/side orientation. Typically, the orientation of the vehicle is such that its front and left sides are visibly defined as a front-left orientation. Note, however, that the proposed solution, in the embodiments disclosed herein, may be extended to front-right images. In this scenario, the image is "mirrored" (e.g., flipped horizontally), the shadow generated, and then the image is flipped again.

Inputs to the shadow generation process are a vehicle image and its segmentation mask. The segmentation mask is essentially an array that identifies each pixel as either belonging to the foreground, i.e., vehicle in this case, or the background. The shadow generation process may also take, as an input, a shadow "template", along with the points on the shadow template that correspond to 'contact points' where, for example, the four vehicle tires connect with the ground. One component of the shadow generation process is to identify as many of the contact points on the vehicle image as possible and apply perspective 'warping' to a shadow template to redraw the shadow.

Various embodiments of these features will now be discussed with respect to the corresponding figures.

Figure 1:
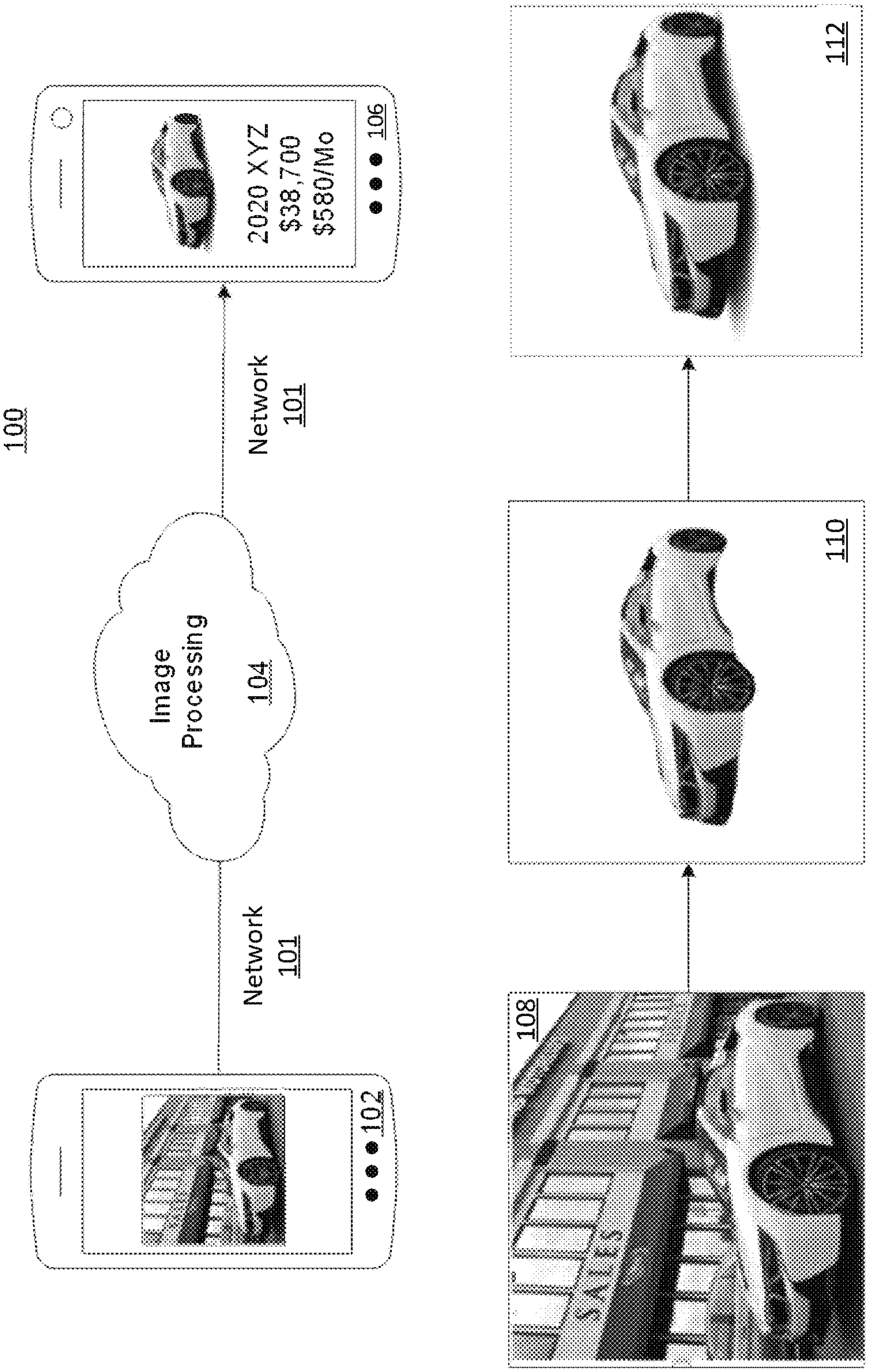
FIG. 1 depicts an illustration of a system for implementing image oriented shopping using realistically shaded image objects, according to some embodiments.

FIG. 1 depicts an illustration of a system 100 for implementing image oriented shopping using realistically shaded image objects, according to some embodiments. System 100 may include a vehicle owner (e.g., private or dealership) interacting with a camera device 102 (e.g., a smartphone) to generate on-site vehicle imagery. The vehicle imagery may be communicated to a local, remote, or a distributed computing system, such as image processing system 104, to execute image processing steps with an imaging application to generate consistent imagery (e.g., centered, same size, facing a same direction, similar lighting, etc.) with realistic shadowing. The term realistic may include shadows that would be expected to be generated by an object of a corresponding shape, size, position and lighting source.

Image processing system 104 may include one or more server devices (e.g., a host server, a web server, an application server, etc.), a data center device, or a similar device, capable of communicating with camera device 102 via network 101. The server may include an image processor, authenticator, image recognizer, object classifier, model generator, and object database. In some embodiments, the server may be implemented as a plurality of servers that function collectively as a cloud database for storing/processing imagery and data received from camera device 102. The plurality of servers can be co-located at a single location (e.g., server farm) or be geographically distributed across multiple locations and/or multiple servers. In some embodiments, the server may be used to store the vehicle imagery 108, segmentation mask 110, image with shadows 112, or vehicle information. Collectively, object processor and authenticator may perform security functions described above for an image application including processing the object information, processing requests associated with accessing, uploading, and deleting files, just to name a few examples. Instead of processing image information locally in camera device 102, camera device 102 may send the image information to the server to perform the processing remotely. An authenticator may be used to authenticate user or location information and encrypt/decrypt data based on information provided by camera device 102. The object database stores objects and associated information. Like object storage, the object database may, in some aspects, differ from conventional storage in that it is configured specifically to store unstructured data associated with objects as a single element.

User device 106 may be connected to the image processing system 104 or to a dealer's system (e.g., server platform) through wired or wireless communication networks 101 to receive and render (e.g., display) a chosen object (e.g., vehicle or vehicles) on a computing device display. User device 106 may include a device, such as a mobile phone (e.g., a smart phone, a radiotelephone, etc.), a laptop computer, a personal computer, a tablet computer, a handheld computer, a gaming device, a wearable communication device (e.g., a smart wristwatch, a pair of smart eyeglasses, augmented reality headsets, interactive heads-up display (HUD), etc.), or a similar type of device. In some embodiments, user device 106 may include a location sensor for location based searching of available vehicles for purchase. Examples of location sensors include any combination of a global position system (GPS) sensor, a digital compass, a IR distance measurement element, cameras with associated camera position solving software, velocimeter (velocity meter), an accelerometer or any known or future location systems.

While described as separate from image processing system 104, a dealer's system may be implemented as one or more servers located in the cloud, another cloud processing system or by a local or remote dealership server network. Dealer System may include one or more servers or databases such as an inventory database, storing existing vehicle inventory as identified, for example, by a vehicle ID. A vehicle information database may store specific vehicle information (pricing, features, options, color, specifications (e.g., drivetrain information, horsepower, torque, length, width, height, etc.) associated with a vehicle ID in the existing inventory. An image database may ingest imagery of vehicles in inventory from various sources such as mobile devices with cameras, fixed cameras, etc. Also, the dealer may ingest imagery of same or different vehicles from the internet, social media, or third-party apps. While described throughout for a vehicle dealer implementation, the technology described herein may be implemented for any image object requiring shadowing.

In some embodiments, when interacting with a physical object, the image application may require multiple images and/or a panoramic view of the physical object. Multiple images from different camera views and angles may be required so that subsequent access is not limited to only one camera angle. These multiple images could then be stored as part of the image object information.

In some embodiments, the image application may also include image processing capabilities to remove certain information or features from an image of the object (e.g., taken from the real-time view) to prevent the chances of false segmentation mask elements (e.g., stray pixels or holes in the vehicle profile) or improper identifications in a vehicle search. For example, if the shadows are included as part of the captured object information, accessing the storage location associated with that vehicle at a later time could require the same shadows to appear in order to provide subsequent identification. To avoid that situation, the image application may remove the background from the image 108 and store that processed image of the object 110 as object information (e.g., segmentation mask) in a storage location. In this manner, recognizing the vehicle would not be dependent on the time of day or specific circumstances of the object when the object was originally created.

In some embodiments, camera device 102 may include hardware components for displaying a real-time view of the physical surroundings in which camera device 102 is used. The camera device 102 may also support one or more image resolutions. In some embodiments, an image resolution may be represented as a number of pixel columns (width) and a number of pixel rows (height), such as 1280×720, 1920×1080, 2592×1458, 3840×2160, 4128×2322, 5248×2952, 5312×2988, or the like, where higher numbers of pixel columns and higher numbers of pixel rows are associated with higher image resolutions.

In some embodiments, camera device 102 may be implemented using one or more camera lenses with each lens having different focal lengths or different capabilities. For example, there may be a wide-angle lens (e.g., 18-35 mm), a telephoto (zoom) lens (e.g., 55 mm and above), a lens with a depth sensor, a lens with a monochrome sensor, or a "standard" lens (e.g., 35-55 mm). Determining a depth of field may be calculated using a dedicated lens having a depth sensor (e.g., Light Detection and Ranging (LIDAR)) or using multiple camera lenses (e.g., telephoto lens in combination with a standard lens).

In some embodiments, the determined distance or depth between camera device 102 and the object may be used to determine a relative location of the object. The relative location of the object refers to the spatial relationship between the object and surrounding objects. The relative location may be used in combination with the physical location to identify the object.

In some embodiments, camera device 102 may also be used to detect the contour of objects displayed in the real-time view. Contour information for each object may be stored as object information. Some object information may be available and/or more accurate when camera device 102 is implemented using more than one camera lens. For example, camera device 102 may be implemented with three camera lenses could be more accurate in acquiring depth of field information and determining the exact relative position and contour between different objects. A contour may generally be considered to be three-dimensional information associated with the object.

In one example, the image application may take advantage of the different capabilities of each lens in performing its object detection and analysis. For example, one lens may be configured to recognize the lighting in the real-time view and can distinguish between day and night clearly; an ultra-wide-angle lens can support wide-angle picture shooting and captures additional details regarding objects surrounding the selected object; yet another lens may be a telephoto lens which supports optical zoom to capture specific details regarding the selected object. The image application may then utilize the information provided by each lens of camera device 102 for not only identifying objects within real-time view but also securely storing and accessing data. In this manner, the image application may be tailored to the capabilities of camera device 102 while still providing the complete functionality as described in this disclosure.

In some embodiments, object information (e.g., contour, size, color, shape) may also be used when verifying that a selected object matches the object that is associated with a location. For example, when the vehicle information is created, an image of the physical object 110 may be stored as part of the creation process. When subsequent access to the vehicle location is requested, the image application may determine that the subsequent access is associated with the same physical object that was used to create the vehicle data. In some embodiments, this may be done via an image comparison between an image of the object that was previously stored and an image of the object that is provided with the request.

In some embodiments, the camera device 102 may support a first image resolution that is associated with a quick capture mode, such as a low image resolution for capturing and displaying low-detail preview images on a display of the user device. In some embodiments, the camera device 102 may support a second image resolution that is associated with a full capture mode, such as a high image resolution for capturing a high-detail image. In some embodiments, the full capture mode may be associated with the highest image resolution supported by the camera device 102.

Network 101 may include one or more wired and/or wireless networks. For example, the network 101 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Figure 2:
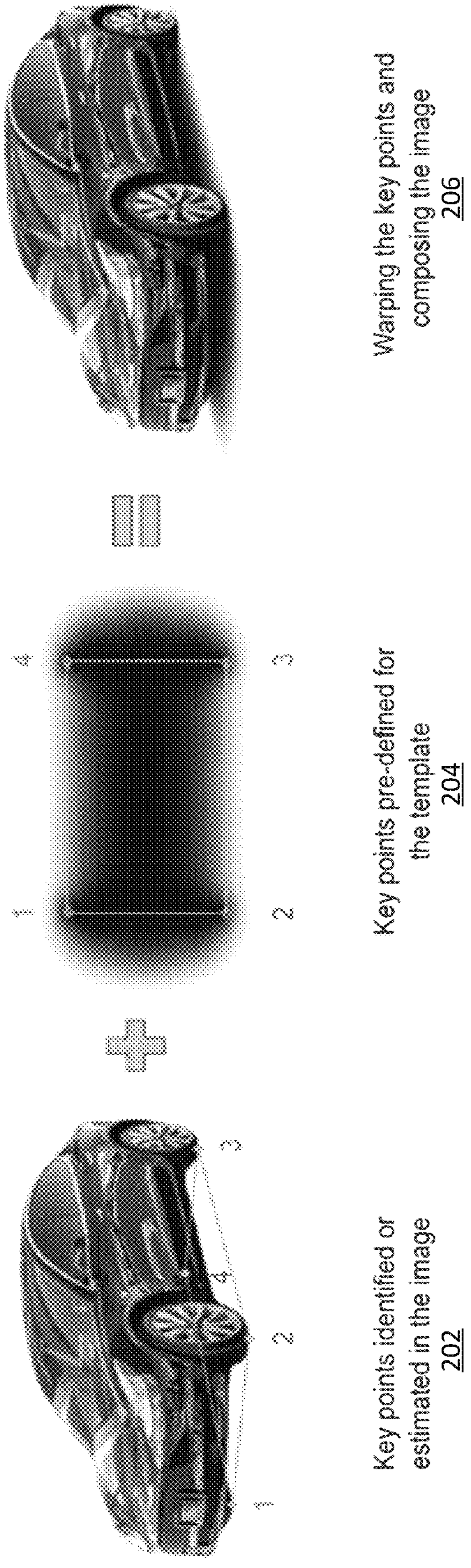
FIG. 2 depicts a high-level illustration for generating realistic shadows for image objects, according to some embodiments.

FIG. 2 depicts a high-level illustration for generating realistic shadows for image objects (e.g., a vehicle from vehicle image 108 captured with camera device 102), according to some embodiments. As a non-limiting example with regard to FIG. 1, one or more processes described with respect to FIGS. 2-8 may be performed by an image processing system (e.g., image processing system 104 of FIG. 1) or a server for processing imagery associated with a physical object that is displayable on a computing device (e.g., mobile device 106) with realistic shadowing.

In some embodiments, an image application may process imagery of an object (e.g., a vehicle) in one or more processing stages. In one non-limiting example, realistic shadows are commonly positioned relative to a ground plane of an object. For example, in one processing stage, the image application may define one or more key points of a selected object, from a group of objects found within imagery. In this manner, the image application may define or estimate one or more lower-most contact points with the ground. As shown, the one or more lower-most contact points may include 4 or more key points 202 where tires contact the ground.

In one processing stage, the image application may define the ground plane relative to a template shadow. For example, a shadow template may be chosen from a library of shadows. Templates may be selected based on a specific identified object (e.g. vehicle model ID), size, profile, angle of incidence, resolution, or lighting, to name a few. The key points 202 defined in the previous image processing stage are predefined as key points in the selected shadow template (e.g., based on a number of tires of the vehicle). For example, as shown, pre-defined key points 204 (1-4) are defined as points on a bounding box within the perimeter of the selected shadow template.

In one processing stage, the image application may warp the template shadow to geometrically align the defined key points 204 to the identified or estimated key points 202. The process is to identify the key points on the vehicle image that correspond to contact points and apply perspective 'warping' to the shadow template to generate an output image 206 with a realistic shadow. The image application may determine whether the resulting image data is stored locally (e.g., mobile device memory) or remotely (e.g., cloud-based platform).

Figure 3:
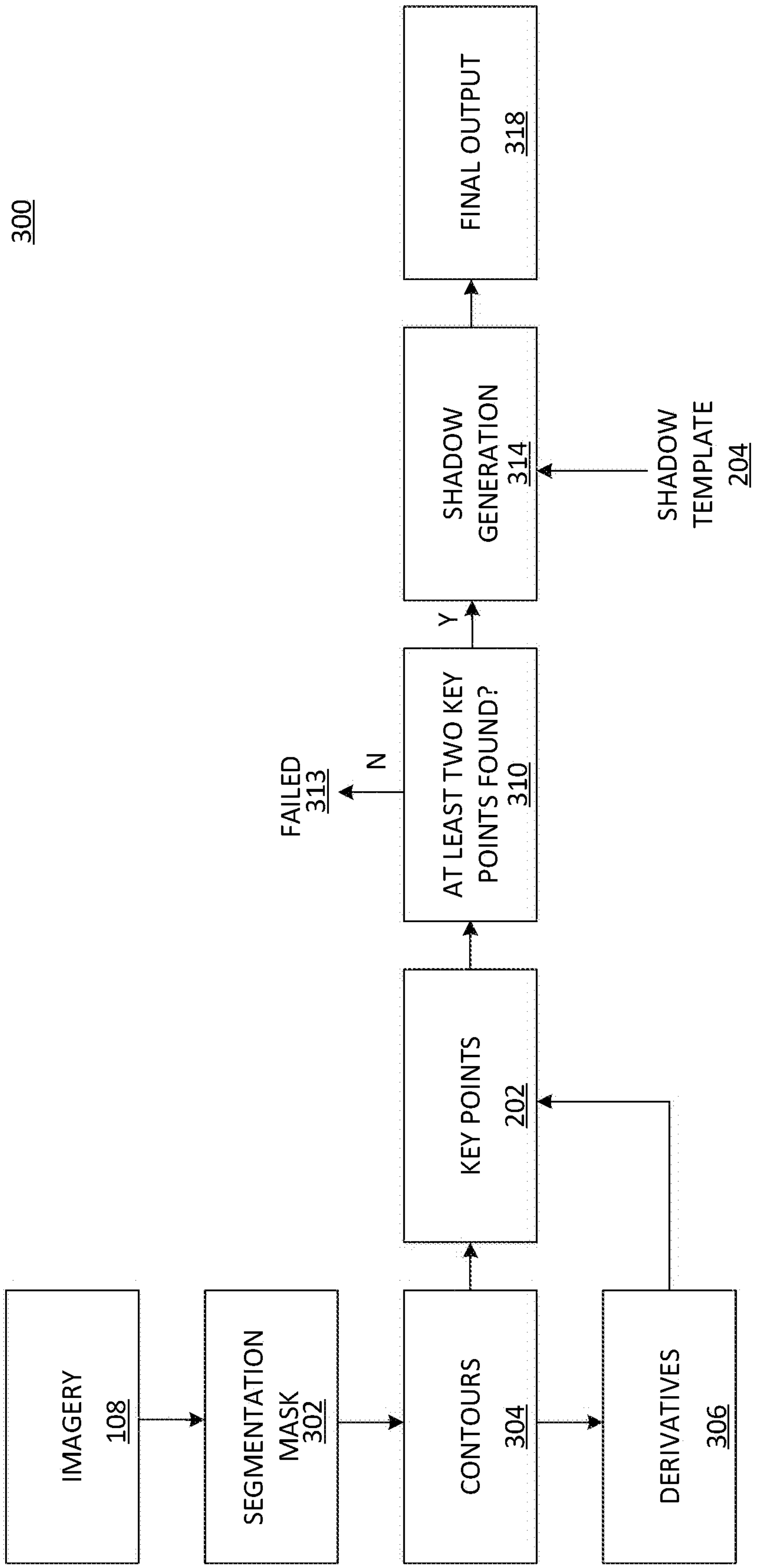
FIG. 3 depicts a flow diagram of a system for implementing shadows for an image object, according to some embodiments.

FIG. 3 illustrates an example flow diagram for generating realistic shadows for image objects, according to some embodiments and aspects. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 3, as will be understood by a person of ordinary skill in the art.

Imagery 108 includes, for example, an object of interest and its background environment. For example, imagery 108 may include a vehicle and its background as captured by a camera device 102.

A segmentation mask 302 may be generated by partitioning the imagery 108 into multiple image segments, also known as image regions or image objects (sets of pixels). A segmentation mask includes the contiguous pixels of the object, but also may include unwanted pixels along the contours of the object or areas where holes in the mask may exist. The goal of segmentation is to simplify and/or change the representation of an image into something that is more meaningful and easier to analyze. Image segmentation is typically used to locate objects and boundaries (lines, curves, etc.) in images. More precisely, image segmentation is the process of assigning a label to every pixel in an image such that pixels with the same label share certain characteristics. Each of the pixels in a region are similar with respect to some characteristic or computed property, such as color, intensity, or texture, to name a few. Adjacent object and background regions may be significantly different with respect to color and the same characteristic(s).

From the segmentation mask 302, the image application discards the background pixels and obtains or extracts a contour. The result of the image segmentation is a set of segments that collectively cover the entire image object. A set of contours (e.g., edges) may be extracted from the image by defining an array of points along the 'boundary' of the mask, which generally follows at least a partially closed curve.

As will be described in greater detail in FIGS. 4-8, a plurality of derivative calculations 306 are used to identify instantaneous rates of change of the contours to identify key points of the image object. For example, the derivative is used to determine the ratio of the instantaneous change in the dependent variable to that of the independent variable. The process of finding a derivative is called differentiation.

Key points 202 of the contours are defined or estimated as one or more lower-most contour points that represent contact points of the object with the ground. At least two key points (e.g., tires) 310 are used to generate a shadow. Less than two points terminates the shadow generation process as "failed" 313. In this scenario, additional images of the object, for example, from different viewpoints may be processed to complete the generation of image of the object with a shadow as a final output 318. As described in FIG. 2, a library of shadow templates 204 is used as an input in the shadow generation process, where the shadow template is perspective warped to align the key points of the object with the key points of the shadow template. The shadow is 'drawn' on a desired background, e.g., plain white, by applying the perspective warping. The vehicle image segmentation is then 'pasted' on top of this shadow to create the final output image 318.

Figure 4:
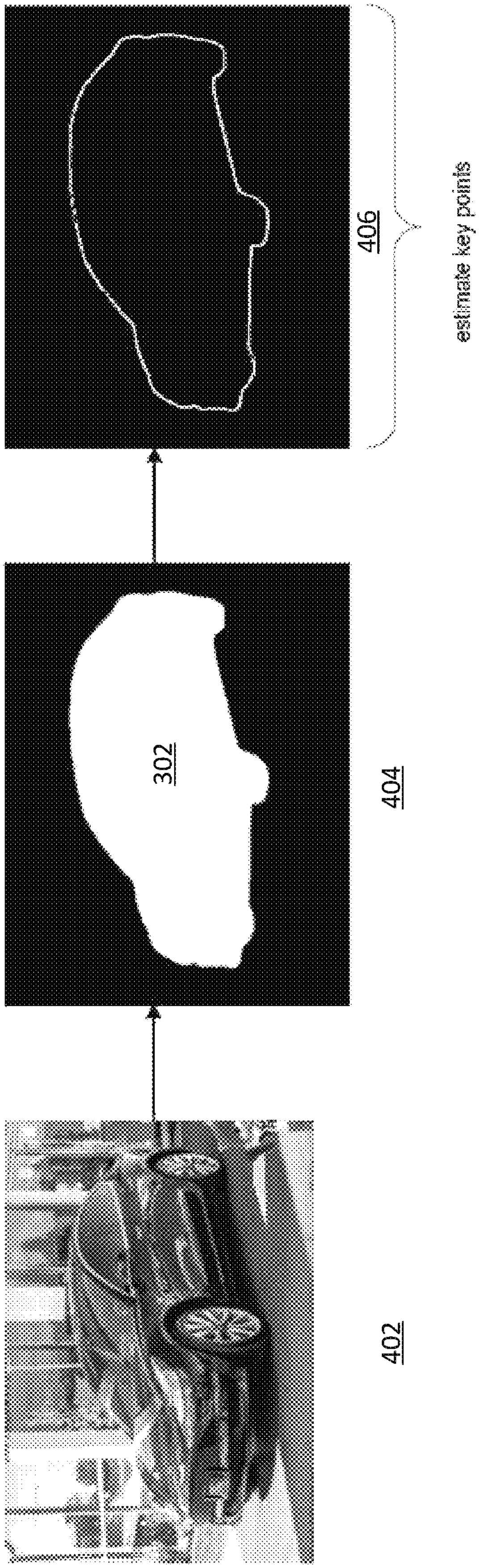
FIG. 4 depicts a graphical illustration for mask and key point processing for an image object, according to some embodiments.

FIG. 4 depicts a graphical illustration for mask and key point processing for an image object, according to some embodiments.

In one processing stage 402, when defining or estimating the key points 202, the image application may process an image and generate a segmentation mask 302. Segmentation mask 302 may be generated by partitioning a digital image into multiple image segments, also known as image regions or image objects (sets of pixels) with a goal of separating the foreground image object (e.g., vehicle) pixels from the background pixels and identifying boundaries (lines, curves, etc.) of the image object.

In one processing stage 404, the image application generates a contour from the segmentation mask 302. The result of image segmentation is a set of segments that collectively cover the entire image. A set of contours (e.g., edges) may be extracted from the image by defining an array of points along the 'boundary' of the mask, which generally follows a closed curve.

In one processing stage 406, from the generated contour(s), the lower contact points (e.g., keypoints 202) are defined or estimated. An estimation is required when one or more of the key points 202 are obscured by the imagery. For example, contacts points at the back of the vehicle image may be partially or fully obscured. As described in greater detail in FIGS. 7 and 8, geometrical estimations may be calculated to define these obscured contact points. For example, if three key points are known, a fourth key point may be calculated based on the geometry of the ground plane defined by the three known key points.

Figure 5:
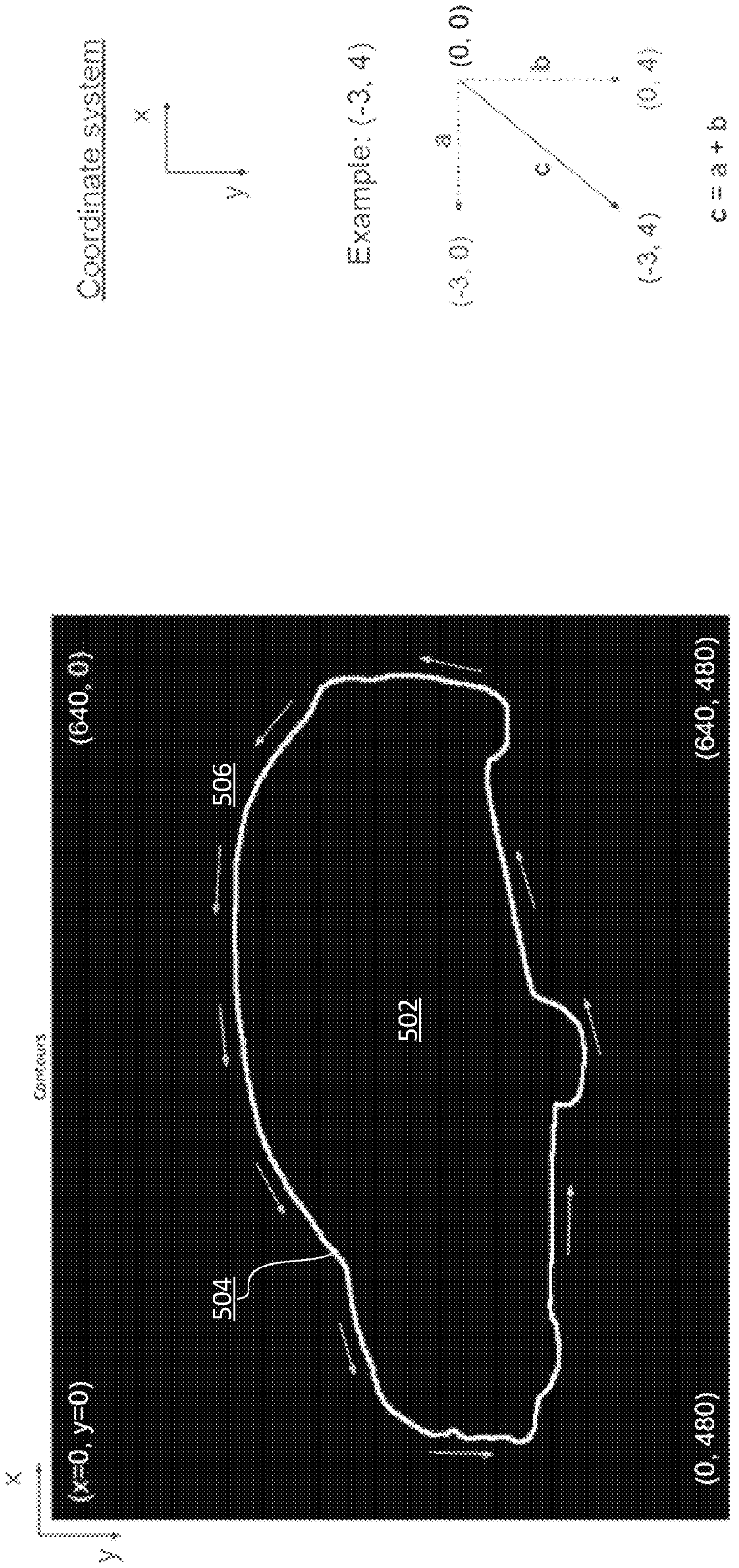
FIG. 5 depicts a graphical illustration for contour processing for an image object, according to some embodiments.

FIG. 5 depicts a graphical illustration for contour processing for an image object, according to some embodiments.

As previously described, derivatives 306 are used to identify an instantaneous rate of change of the contours to identify key points of the image object. For example, the derivative is used to determine the ratio of the instantaneous change in the dependent variable (e.g., "x") to that of the independent variable (e.g., "y").

As illustrated, using a two dimensional pixel based coordinate system, an upper left corner is designated as an initial point 0, 0, where x=0 and y=0. Vehicle segmentation mask 502 may include contour(s) 504 defined within the coordinate system. In some embodiments, the contour(s) may include noise. In this scenario, contours 504 may be first smoothed by applying Gaussian smoothing (1-dimensional) to the contour. The smoothed contour is then navigated to identify regions of the vehicle that assist in identifying regions and key points.

The image application calculates first and second derivatives (or "gradients") by moving along the contour in a counter-clockwise direction 506. In some embodiments, further smoothing may be applied after the first derivative calculations. The second derivatives are then computed after applying the smoothing to the first derivatives.

The image application identifies, using the first and second derivative calculations, at least the left, right, top and bottom 'bounds' for the contour. These initial boundary points may be subsequently used to identify regions and key points, as described in greater detail in FIGS. 6-8.

Figure 6:
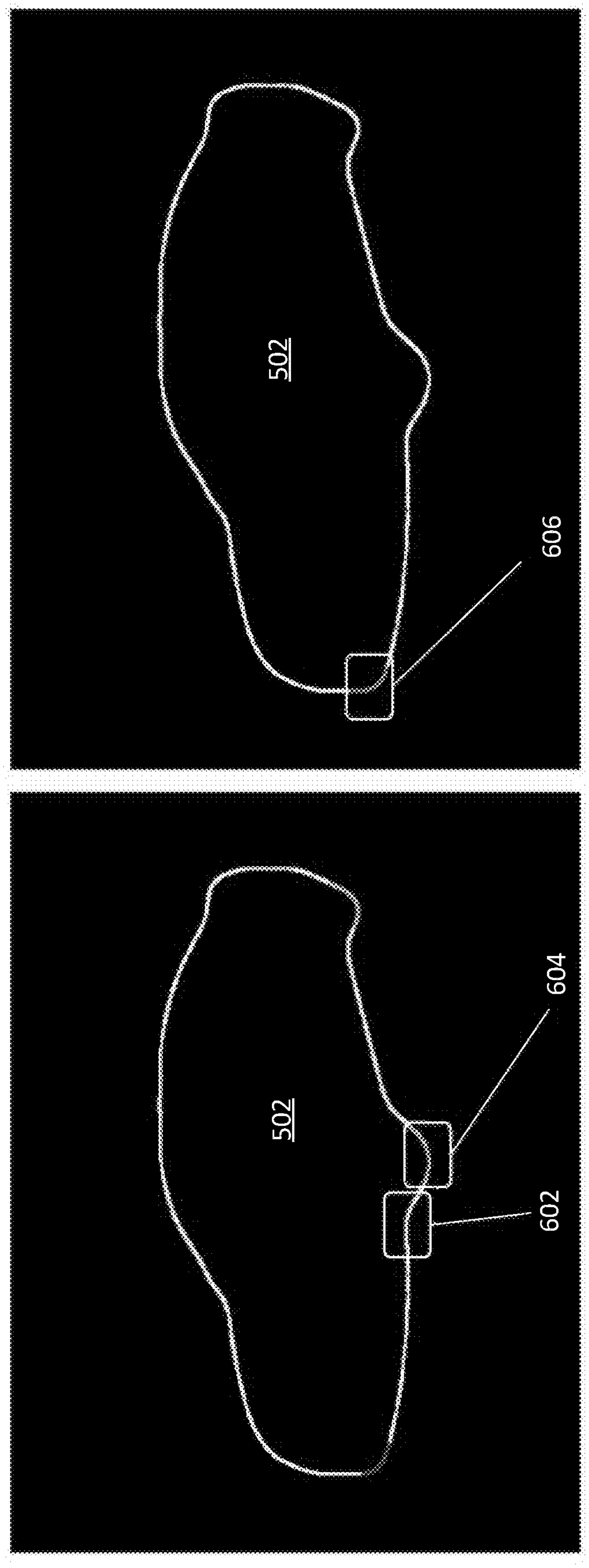
FIG. 6 depicts a graphical illustration for key point processing for an image object, according to some embodiments.

FIG. 6 depicts a graphical illustration for key point processing for an image object, according to some embodiments.

The left, right, top and bottom 'bounds' for the contour correspond to the sides of a rectangle that tightly encloses the contour. Using these bounds, the image application calculates regions (e.g., a set of continuous points on the contour) of the contour that correspond to the bounds, e.g., 10% left (e.g., move from left to right and stop at 10% of the width). The "regions" of the contour are identified by applying filters on the derivatives, as well as taking the contour bounds (computed above) into account. In a non-limiting example, a region 602 preceding a Front Left (FL) tire region 604 is identified.

In some embodiments, some of the regions may be relabeled by considering the relationship between other regions. For example, if a first region of a first gradient is preceded by a second region of a second gradient within a certain distance (within the contour array), the second region may be better identified. For example, the regions that correspond to the tires of the vehicle, may be identified in a specific order. The relabeling feature may be implemented when an unexpected ordering is encountered. For example, following the contour(s) in a counterclockwise direction, it would be expect to identify the Front Right, Front Left and Rear Left in order. Once the regions are found, the key points are extracted from each region. To extract a key point from each region, the image application selects the point that corresponds to the lowest absolute value of dy (first y-derivative). In four tire vehicle embodiments, four key points are defined on the vehicle image, one corresponding to each tire.

If stored remotely, a file request (identifying the requested file) and the retrieved location information and object information are retrieved from the remote location for further processing.

Figure 7:
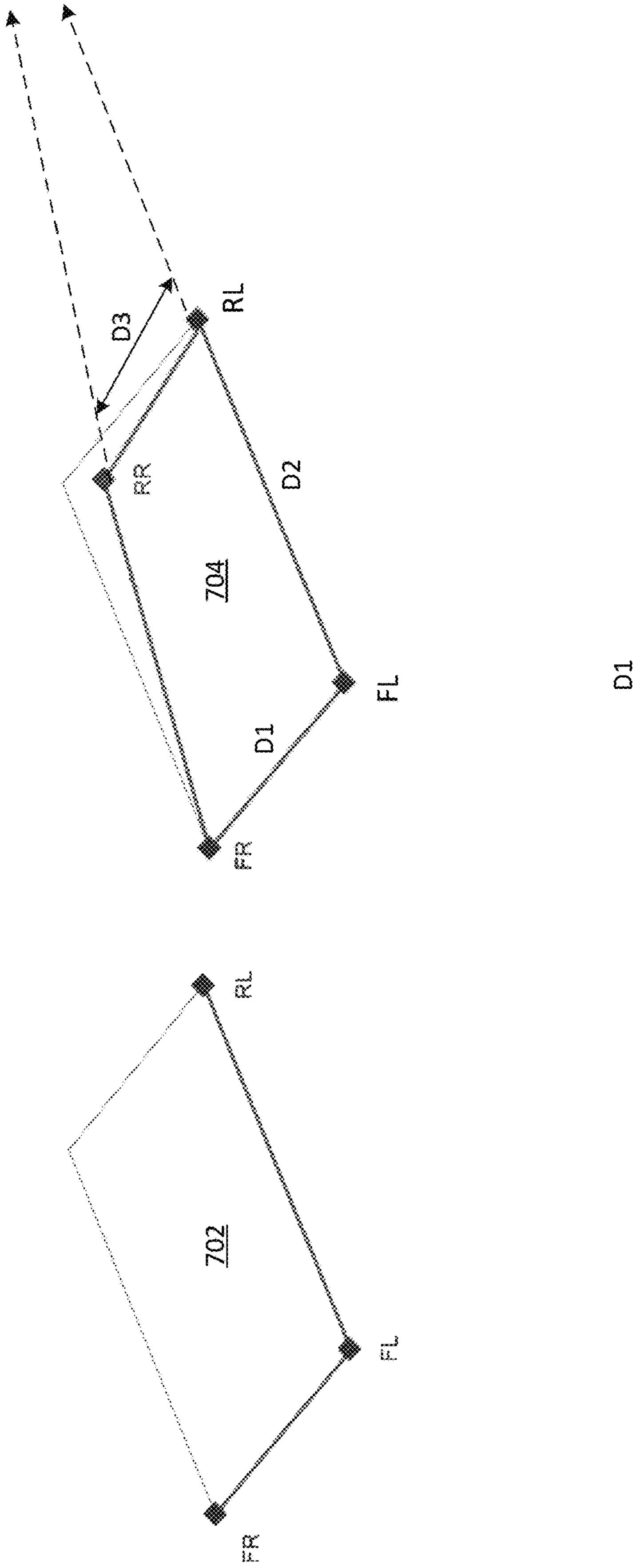
FIG. 7 depicts a graphical illustration for key point estimations for an image object, according to some embodiments.

FIG. 7 depicts a graphical illustration for estimating key points as per FIGS. 2 and 3, element 202, according to some embodiments. As a non-limiting example with regards to FIGS. 2-3, one or more processes described with respect to FIG. 7 may be performed by an image processing system 104 or a server for estimating the key points. It is to be appreciated that not all steps may be needed to perform the disclosure provided herein. Further, some of the steps may be performed simultaneously or in a different order than shown in FIG. 7, as will be understood by a person of ordinary skill in the art.

In 702, an object (e.g., vehicle) may include two or more key points that may define a ground plane by any of the methods previously described herein. However, one or more key points in the segmentation mask 302 may be obscured and therefore not easily defined by a contour analysis. As shown, Front Right (FR), Front Left (FL) and Rear Left (RL) tire contact points have been defined from the contours of the segmentation mask. However, a Rear Right (RR) tire contact point may be obscured and therefore an estimate may need to be generated for its position.

The term "estimated" reflects that, because image objects may be taken at different angles, one or more of the key points 202 may be obscured by the imagery. Geometrical estimations may be calculated to define these obscured contact points. In 704, if three key points are known, a fourth key point may be calculated based on the known geometry of a ground plane defined by three key points and its associated skew. Skew is a measure of the asymmetry of the object's ground plane. For example, the ground plane is asymmetrical when its left and right side are not mirror images. In some embodiments, the skew may be calculated by a vanishing point calculation. A vanishing point is a point on the image plane of a perspective rendering where the two-dimensional perspective projections of mutually parallel lines in three-dimensional space appear to converge. In other words, geometrically the viewable distance D1 between two points (e.g., tire contact points (FR and FL)) diminishes with distance. At a known distance D2 along a vanishing point line, a geometrical calculation will generate an estimate for the Rear Right (RR) tire contact point based on a distance D3 from the RL tire contact point and provide a fourth key point to be used with the shadow template. In one example embodiment, a parallelogram may be drawn for the defined key points and the back side "shortened" to D3 based on the known distance D2 (e.g., using the coordinate system).

Figure 8:
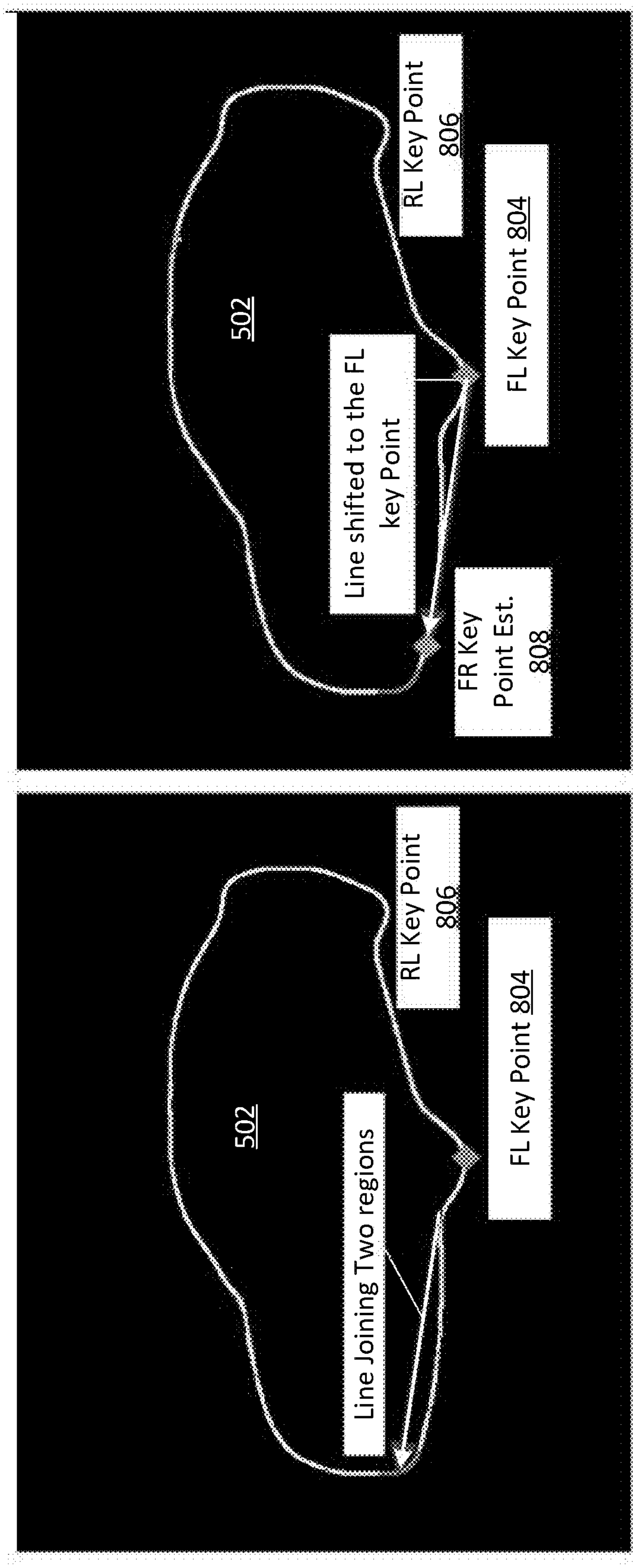
FIG. 8 depicts another graphical illustration for key point estimations for an image object, according to some embodiments.

FIG. 8 depicts another graphical illustration for key point estimations for an image object, according to some embodiments. As illustrated, if only two key points (e.g., tires) are defined (FL 804 and RL 806), a position of the FR tire may be estimated heuristically. In a non-limiting example, a straight line is drawn between the regions preceding the front left tire and the front right bumper region. This line is then "moved" to connect to the front left tire key point. The other end of the line marks an estimate of the FR key point 808 (e.g., FR tire). The RR key point (not shown) may be subsequently estimated as previously described in accordance with FIG. 7.

Alternatively, or in addition to, one or more components of the image application process may be implemented within the camera device 102, third-party platforms, a cloud-based system, or distributed across multiple computer-based systems. The User Interface (UI) of the user device 106 may render any of the images, graphics, audio, additional content, financial information related to purchase of the image object, etc. In one technical improvement over current processing systems, the image application eliminates poor quality, unrealistic shadow generation implemented by current imaging systems, thus improving a user browsing experience.

Figure 9:
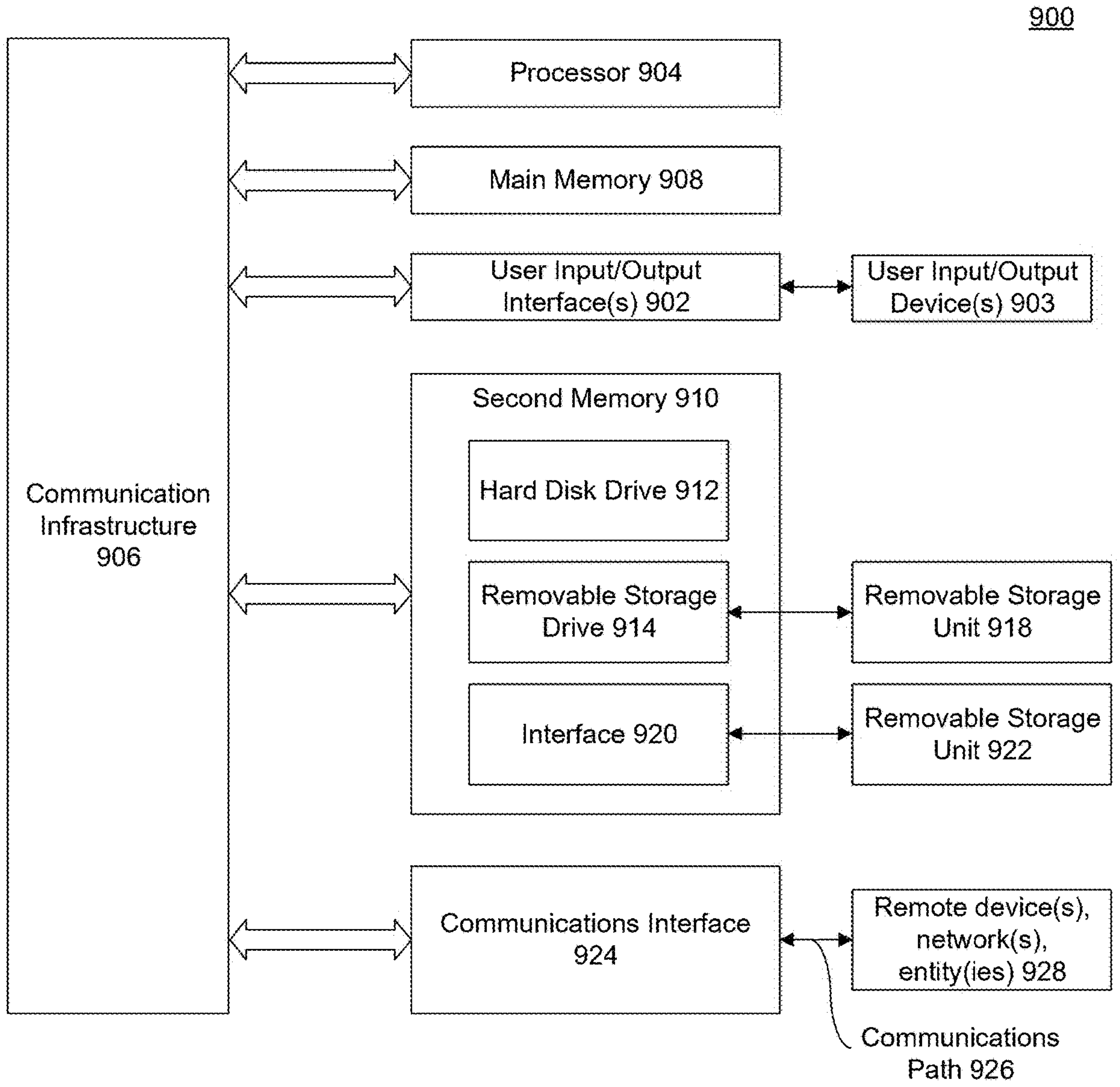
FIG. 9 depicts an example computer system useful for implementing various embodiments.

Various embodiments may be implemented, for example, using one or more well-known computer systems, such as computer system 900 shown in FIG. 9. One or more computer systems 900 may be used, for example, to implement any of the embodiments discussed herein, as well as combinations and sub-combinations thereof. Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method to generate a shadow for an image object, the computer-implemented method comprising:

generating, from received imagery, a segmentation of the image object, wherein the segmentation is generated based on a segmentation mask comprising an array of contiguous pixels of the image object;

generating a contour from the segmentation mask, wherein the contour comprises an array of the pixels along a boundary of the segmentation mask;

calculating a plurality of regions of the contour, wherein each of the plurality of regions comprises a set of continuous points;

identifying within the plurality of regions of the contour, a plurality of key points that correspond to ground contact points of the image object;

applying, based on the plurality of key points, a perspective warping to a first shadow template to generate the shadow for the image object; and rendering, on a selected background, the segmentation of the image object as an overlay on the shadow.

2. The computer-implemented method of claim 1, further comprising removing a background of the received imagery.

3. The computer-implemented method of claim 1, wherein the contour comprises at least a partially closed curve.

4. The computer-implemented method of claim 1, further comprising applying a one-dimensional Gaussian smoothing to the contour.

5. The computer-implemented method of claim 4, further comprising calculating a plurality of first derivatives along the contour.

6. The computer-implemented method of claim 5, wherein the identifying the plurality of key points comprises calculating the plurality of first derivatives along the contour in a selected direction to identify instantaneous rates of change of the contour, and wherein each of the plurality of key points correspond to a pixel that corresponds to a lowest absolute value of a first y-derivative, where y is a coordinate in an x-y coordinate system of the received imagery.

7. The computer-implemented method of claim 6, applying smoothing to the calculated plurality of first derivatives.

8. The computer-implemented method of claim 7, wherein the identifying the plurality of key points further comprises applying filters on the plurality of first derivatives.

9. The computer-implemented method of claim 7, wherein the identifying the plurality of key points further comprises calculating a plurality of second derivatives along the contour in the selected direction.

10. The computer-implemented method of claim 1, wherein the image object is a vehicle and the plurality of key points correspond to a plurality of ground contact points of tires of the vehicle.

11. The computer-implemented method of claim 1, further comprising estimating additional ones of the plurality of key points to assist in the perspective warping of the first shadow template.

12. A system, comprising:

a memory; and one or more processors configured to:

generate, from received imagery, a segmentation of an image object, wherein the segmentation is based on a segmentation mask comprising an array of contiguous pixels of the image object;

generate a contour from the segmentation mask, wherein the contour comprises an array of the pixels along a boundary of the segmentation mask;

calculate a plurality of regions of the contour, wherein each of the plurality of regions comprises a set of continuous points;

identify within the plurality of regions of the contour, a plurality of key points that correspond to ground contact points of the image object;

apply, based on the plurality of key points, a perspective warping to a first shadow template to generate a second shadow for the image object; and render, on a selected background, the segmentation of the image object as an overlay on the second shadow.

13. The system of claim 12, further configured to apply a one-dimensional Gaussian smoothing to the contour.

14. The system of claim 12, further configured to calculate a plurality of first derivatives and second derivatives along the contour to identify the plurality of key points, wherein each of the plurality of key points correspond to a pixel that corresponds to a lowest absolute value of a first y-derivative, where y is a coordinate in an x-y coordinate system of the received imagery.

15. The system of claim 12, wherein the image object is a vehicle and the plurality of key points correspond to a plurality of ground contact points of tires of the vehicle.

16. The system of claim 12, further configured to estimate additional ones of the plurality of key points to assist in the perspective warping of the first shadow template.

17. A non-transitory computer-readable device having instructions stored thereon that, when executed by at least one computing device, cause the at least one computing device to perform operations comprising:

generating, from received imagery, a segmentation of an image object, wherein the segmentation is generated based on a segmentation mask and the segmentation mask comprises an array of contiguous pixels of the image object;

generating a contour from the segmentation mask, wherein the contour comprises an array of the pixels along a boundary of the segmentation mask;

calculating a plurality of regions of the contour, wherein each of the plurality of regions comprises a set of continuous points;

identifying within the plurality of regions of the contour, a plurality of key points that correspond to ground contact points of the image object;

applying, based on the plurality of key points, a perspective warping to a first shadow template to generate a second shadow for the image object; and rendering, on a selected background, the segmentation of the image object as an overlay on the second shadow.

18. The non-transitory computer-readable device of claim 17, comprising further operations to calculate a plurality of first derivatives and second derivatives along the contour to identify the plurality of key points, wherein each of the plurality of key points correspond to a pixel that corresponds to a lowest absolute value of a first y-derivative, where y is a coordinate in an x-y coordinate system of the received imagery.

19. The non-transitory computer-readable device of claim 17, wherein the image object is a vehicle and the plurality of key points correspond to a plurality of ground contact points of tires of the vehicle.

20. The non-transitory computer-readable device of claim 17, comprising further operations to estimate additional ones of the plurality of key points to assist in the perspective warping of the first shadow template.

* * * * *